(12) United States Patent
Custer et al.

(10) Patent No.: US 8,902,767 B2
(45) Date of Patent: Dec. 2, 2014

(54) COMMUNICATIONS EFFECTS IN NETWORK SIMULATIONS

(75) Inventors: Robert C. Custer, Corona, CA (US); Robert J. Harrison, Saint Charles, MO (US); Brian J. Waltersdorf, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 652 days.

(21) Appl. No.: 12/969,574

(22) Filed: Dec. 15, 2010

(65) Prior Publication Data

US 2012/0155522 A1    Jun. 21, 2012

(51) Int. Cl.
*H04L 12/28* (2006.01)
*H04W 16/22* (2009.01)
*H04J 1/16* (2006.01)

(52) U.S. Cl.
CPC .................................... *H04W 16/22* (2013.01)
USPC ............ 370/252; 370/241; 370/329; 370/386

(58) Field of Classification Search
USPC .............. 379/265.06, 221.06, 9.01; 711/219, 711/220; 717/124, 104, 126, 127, 135, 147, 717/167, 168, 169, 171, 175, 176, 177, 717/178; 370/913, 252, 241, 241.1, 245, 370/248, 386, 329

See application file for complete search history.

(56) References Cited

U.S. PATENT DOCUMENTS

| | | | |
|---|---|---|---|
| 5,563,874 A * | 10/1996 | Kant | 370/252 |
| 5,710,758 A * | 1/1998 | Soliman et al. | 370/241 |
| 6,600,723 B1 * | 7/2003 | Reeb et al. | 370/245 |
| 7,185,254 B2 * | 2/2007 | Ishida et al. | 714/738 |
| 7,379,846 B1 * | 5/2008 | Williams et al. | 702/185 |
| 7,508,748 B2 * | 3/2009 | Kadous | 370/208 |
| 7,606,575 B2 * | 10/2009 | Mahany et al. | 455/452.2 |
| 7,940,685 B1 * | 5/2011 | Breslau et al. | 370/251 |
| 2006/0080077 A1 * | 4/2006 | Johnson et al. | 703/22 |
| 2007/0036088 A1 * | 2/2007 | Singh et al. | 370/252 |

* cited by examiner

*Primary Examiner* — John Pezzlo
(74) *Attorney, Agent, or Firm* — Hugh P. Gortler

(57) ABSTRACT

Real-time, high fidelity communication effects are simulated. A transmitter in a platform simulation is requested to send a surrogate message to a receiver in the platform simulation. Communications effects are computed in response to the message, and the communications effects are saved for later use. When a future communication event involving the transmitter and receiver occurs, the saved effects are used to simulate the communication effects for that event.

11 Claims, 6 Drawing Sheets

COMMUNICATIONS EFFECTS IN NETWORK SIMULATIONS

BACKGROUND

Network simulation is used to design various kinds of networks, simulate and then analyze the effect of various parameters on network performance. Network simulation tools can test scenarios that might be particularly difficult or expensive to emulate using real hardware.

In a simulation of a radio network, where a message is transmitted wirelessly from one node to another, a perfect communication may be modeled. In a perfect communication, every message is received without error or delay. Although a perfect communications model significantly simplifies the simulation, it does not reflect the actual conditions that wireless communications encounter in the real world. Thus, it can introduce significant inaccuracies in simulation results.

For a more accurate simulation, communications effects may be incorporated. Communications effects refer to communications within a simulation environment in a manner that is consistent with effects experienced in the real world. For instance, messages might be dropped, corrupted, delayed, jammed, or blocked by terrain, or they may be affected by weather, network congestion, etc.

To incorporate realistic communications effects, calculations are performed on each simulated radio transmission to evaluate the effects of certain characteristics (e.g., location of receiver, blockage of line of sight, effects of network protocols) on each transmitter and receiver. Each message is either delivered with realistically calculated errors, noise, and delays or it is not delivered at all (that is, dropped).

The communication effects are simulated by performing calculations inline at the time they occur in the simulation. For each separate radio transmission that occurs in a simulation, a network simulator tool is invoked to perform all communication effects calculations.

There are problems with simulating communications effects in large networks. In simulations of low latency networks, delivery decisions can take too long to compute. The time taken to simulate a transmission might take considerably longer than the time required to deliver the decision. If target/contact calculations are based on a (realistic) low latency (as is the case with cockpit simulators), the entire simulation can be rendered invalid or unworkable.

Drop decisions can cause additional problems. If a network simulator cannot distinguish between a message that is slow and a message that will never arrive, it will wait until the message arrives or a timeout occurs (whichever occurs first). By waiting, simulator resources are tied up.

Network scalability is also a problem. Each communication effect can require a large amount of computations. Moreover, the number of computations per transmission increases as higher fidelity communications effects are needed. Thus, high fidelity simulations might be achievable for a hundred nodes, but not for thousands of nodes. Or, if the number of computations per transmission is held the same as the number of simulated nodes increases, the communication effects fidelity is reduced.

It would be desirable to overcome these problems.

SUMMARY

According to an aspect herein, a method comprises using a communications effects engine to simulate real-time, high fidelity communications effects for a platform simulation. A transmitter in the platform simulation is requested to send a surrogate message to a receiver in the platform simulation. Communications effects are computed in response to the message, and the communications effects are saved for later use. When a future communication event involving the transmitter and receiver occurs, the saved effects are used to simulate the communication effects for that event.

According to another aspect, a system comprises a platform simulation engine for performing a platform simulation. The platform simulation includes a plurality of transmitter-receiver pairs. The system further comprises a communications effects engine for simulating real-time, high fidelity communications effects of transmissions between the transmitter-receiver pairs. For each pair, the platform simulation periodically sends probes from the transmitter to the receiver. In response to each probe, the communications effects engine computes and saves communications effects for the corresponding transmitter-receiver pair. When a future communication event in the platform simulation involves a transmitter-receiver pair, the communications effects engine uses the saved effects of that pair to simulate the communication effects for the event.

According to another aspect, an article for a server comprises memory encoded with data for causing the server to interact with a platform simulator. The data, when executed, causes the server to periodically request the platform simulator to generate probes for all transmitter-receiver pairs of interest; compute communications effects data in response to the probes and save the communications effects data; and distribute the saved communications effects data to a plurality of platform simulators in advance of future communications events so the platform simulators can use the data to simulate the future communications events.

DETAILED DESCRIPTION

Figure 1:
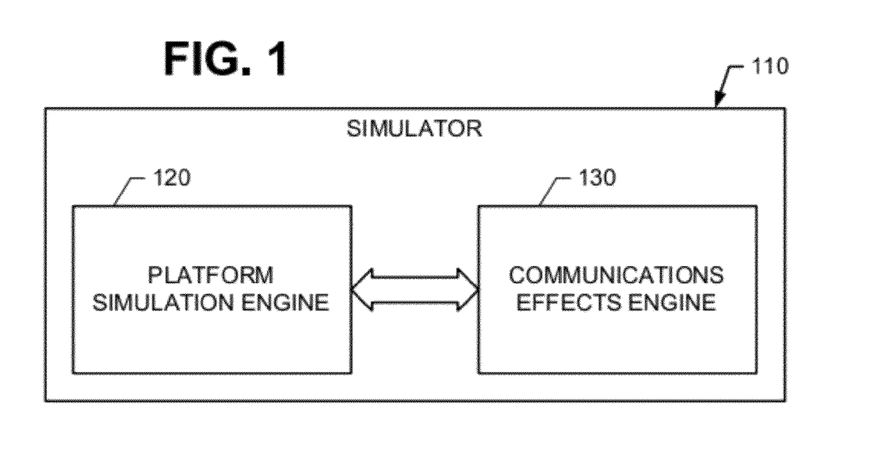
FIG. 1 is an illustration of a simulator including a platform simulation engine and a communications effects engine.

Reference is made to FIG. 1, which illustrates a simulator 110 including a platform simulation engine 120 and a communications effects engine (CEE) 130. The platform simulation engine 120 simulates an environment including a plurality of platforms. For example, the platform simulation engine simulates force effects such as platform movement, operation and interaction.

At least some of the platforms have receiver and/or transmitter characteristics. The platform simulation engine 120 simulates transmitter-receiver communications of transmitter-receiver pairs during the simulation. In a transmitter-receiver communication, a transmitter transmits a message to a receiver over a communications link.

Figure 2:
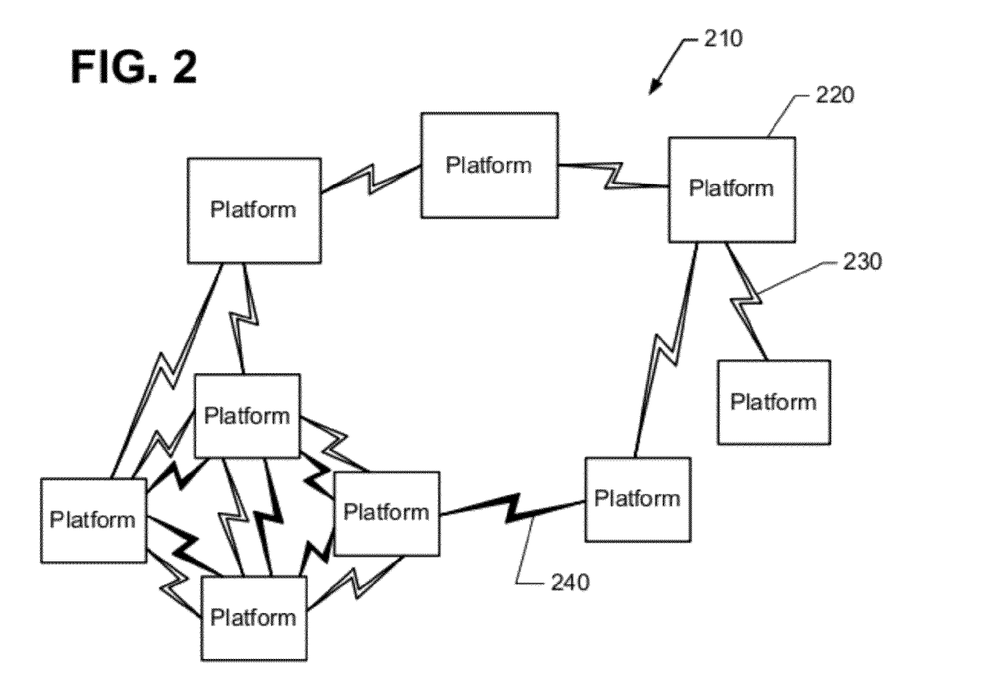
FIG. 2 is an illustration of a radio network.

Additional reference is made to FIG. 2, which illustrates an example of a radio network 210. The radio network 210 includes a plurality of platforms 220 that function as a radio receiver, or radio transmitter, or both. The platforms 220 communicate via communications links 230 and 240, which have statistical connectivity, delay, and error characteristics. These characteristics may be affected by a number of factors, including, but not limited to radio transmission frequency, bandwidth, power, modulation, location of each potential transmitter and receiver, blockage of a line-of-sight radio signal by terrain or structures, antenna type, characteristics, gain patterns, orientation, signal fading or loss due to weather or other atmospheric effects, multipath reflections, jamming, individual and overall network traffic loads, and effects of network protocols (which can dynamically drop or delay messages to accommodate higher priority traffic or to ease network congestion). These characteristics can vary over the course of a simulation.

The platforms 220 may be stationary or mobile. The links 230 and 240 may be wired or wireless or any combination thereof. A number of mobile platforms 220 could form a wireless ad hoc network, in which the communication links are dynamic and wireless.

The network 210 is not limited to any particular number of platforms 220. The platforms 220 may form a single network, subnets within a network, or multiple networks. The network 210 of FIG. 2 happens to illustrate nine platforms 220 that form first and second networks. The first network is formed by the filled links 240, and the second network is formed by the unfilled links 230.

A message can affect actions in the simulation. For example, a message might cause a platform to change its position or mode of operation. Thus, the platform simulation engine 120 needs to know how long a message takes to arrive, if that message arrives at all. However, the platform simulation engine 120 does not account for the terrain, atmospheric conditions, network topology, routing protocols, network loading, etc.

The CEE 130 simulates the communication effects with a high level of fidelity. In addition to accounting for transmitter and receiver characteristics, the CEE 130 accounts for other characteristics (including those listed above) that can affect message delivery.

Figure 3:
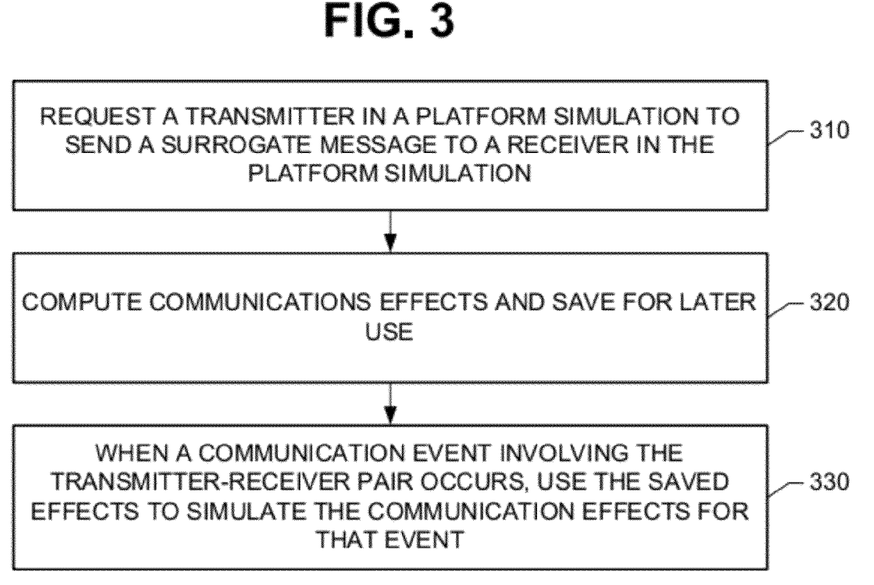
FIG. 3 is an illustration of a method of simulating real-time, high fidelity communication effects within a radio network simulation.

Reference is made to FIG. 3, which illustrates a method of simulating real-time, high fidelity communication effects within a radio network simulation. At block 310, a short surrogate message or probe is sent from a transmitting platform in the platform simulation to a receiving platform in the platform simulation. Size and format of the message is dictated by simulation needs. As but one example, the message may consist of a simple header and several bytes of data.

At block 320, communication effects are computed in response to the surrogate message. The communication effects are computed just as they would be for a message sent by a transmitting platform during a simulation (i.e., by a network simulator). Simulated routing protocols provide representative route convergence and route selection delays. Simulated message loads are representative of a real radio network, as are simulated end-to-end delays and congestion.

The communications effects are saved for later use. The communications effects may be saved in a lookup table.

At block 330, when a communication event involving the transmitter-receiver pair occurs, the saved effects are used to simulate the communication effects for that event. As a first example, the saved effects show no connectivity for the receiving platform. When a message is sent between the pair during the simulation, the network simulation immediately shows a drop decision rather than waiting for a timeout to occur. As a second example, the saved effects show that a message between the pair will be delivered with calculated errors, noise, and delays. When a message is sent from the transmitting platform to the receiving platform during the platform simulation, the saved effects are used to determine errors, noise and delay of the delivered message.

Figure 4:
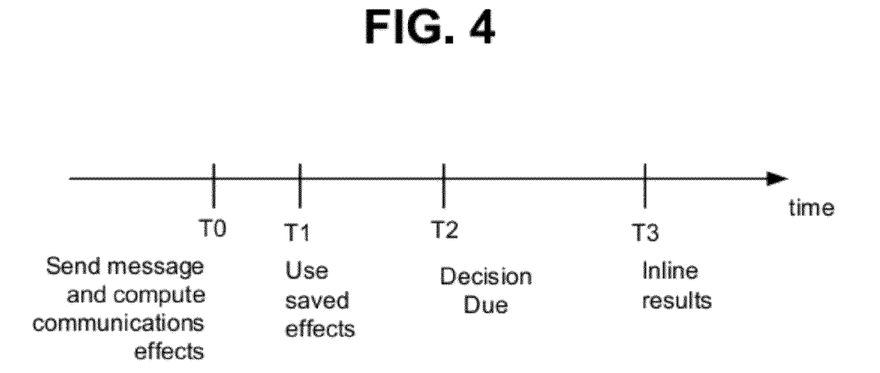
FIG. 4 is an illustration of response times in a low latency network.

Additional reference is made to FIG. 4, which illustrates advantages of this method. Consider a low latency network. A receiving platform receives a transmission at time T1, and it must deliver a decision by time T2. Had the decision been computed, it would have been delivered at time T3, which is too late. However, by sending a probe from the transmitting platform to the receiving platform, and generating and saving the communication effects at time T0, the saved effects can be used at time T2. Thus, a delivered decision is timely.

Another advantage is that drop decisions can be made immediately. If the communication effects saved at time T0 indicate that the receiving platform is unable to receive a message, the drop decision can be made at time T1 instead of waiting until time T2. This allows simulation resources to be freed up.

Accuracy of the saved effects will depend in part on how close in time a probe is to the transmission in the platform simulation (that is, the difference between times T0 and T1). Accuracy also depends on how closely the network simulation traffic matches the platform simulation traffic and how closely the probe message characteristics match the characteristics of the messages in the simulation (e.g. size, protocol type, priority).

Accuracy of the saved effects can be improved by sending additional probes at periodic intervals, whereby the saved effects are updated. The probes may be sent at intervals fast enough that the network state does not change appreciably between them but slow enough that network loading is virtually unaffected.

The method of FIG. 3 has been described for a single pair of transmitting-receiving platforms. In practice, a simulation may include many of these transmitter-receiver pairs. The method of FIG. 3 can be applied to each transmitter-receiver pair in the simulation.

Figure 5:
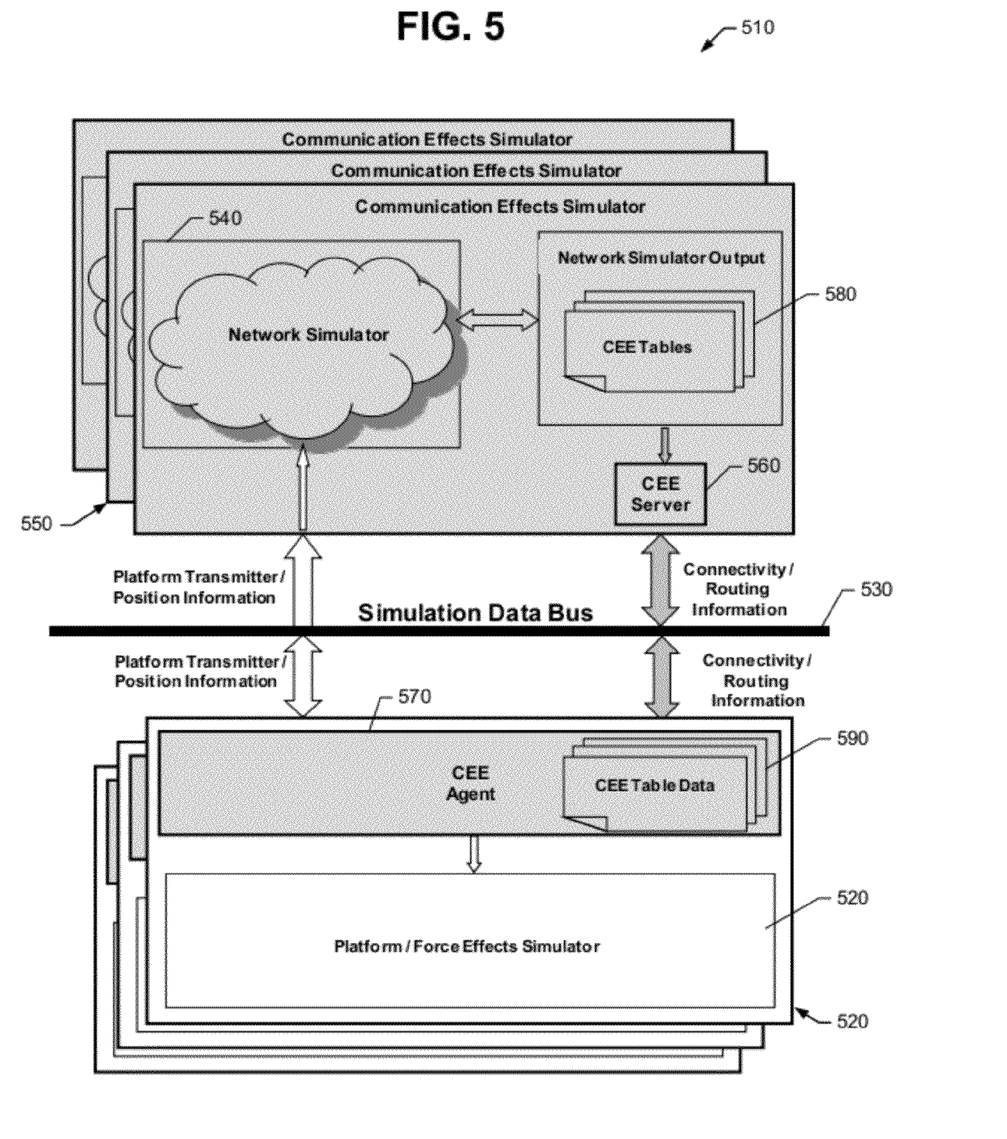
FIG. 5 is an illustration of a distributed simulation including platform/force effects simulators, a communications effects server, and communications effects agents.

Reference is now made to FIG. 5, which illustrates a simulator 510 including a distributed platform simulation engine and a distributed communications effects engine. Components of the CEE are shaded, and components of the platform simulation engine are not shaded.

The platform simulation engine includes a plurality of platform force effects simulators 520. The force effects simulators 520 provide platform position and transmitter information to the CEE via a simulation data bus 530 using a protocol for data exchange. One such protocol is Distributed Interactive Simulation (DIS), which is a recognized IEEE standard. Another protocol that can be used is Higher-Level Architecture (HLA). The force effects simulators 520 may reside on a plurality of clients 535, which may be implemented in hardware as a plurality of networked computers.

The CEE includes a plurality of network simulators 540, which use the platform position and transmitter information to simulate a radio network with high fidelity. The network simulators 540 may be a proprietary simulation tool or a commercial off-the-shelf simulation tool, such as OPNET, QualNet or CORE. The network simulators 540 simulate the protocols (routing, data transfer, etc.) and traffic loading. They may generate end-to-end connectivity (connected/disconnected) and traffic statistics (min delay, mean delay, etc.)

on connections of interest (i.e. relevant to force effects simulation). The network simulators 540 may also generates link connectivity and loading statistics. On request, the current end-to-end route is reported for a specified source-destination pair. The network simulators 540 may reside on a single computer 550 or a plurality of networked computers.

The CEE further includes a CEE server 560, which communicates with CEE agents 570 over the simulation data bus 530. The CEE agents 570 provide an interface between the CEE server 560 and the platform effects simulators 520.

Figure 6:
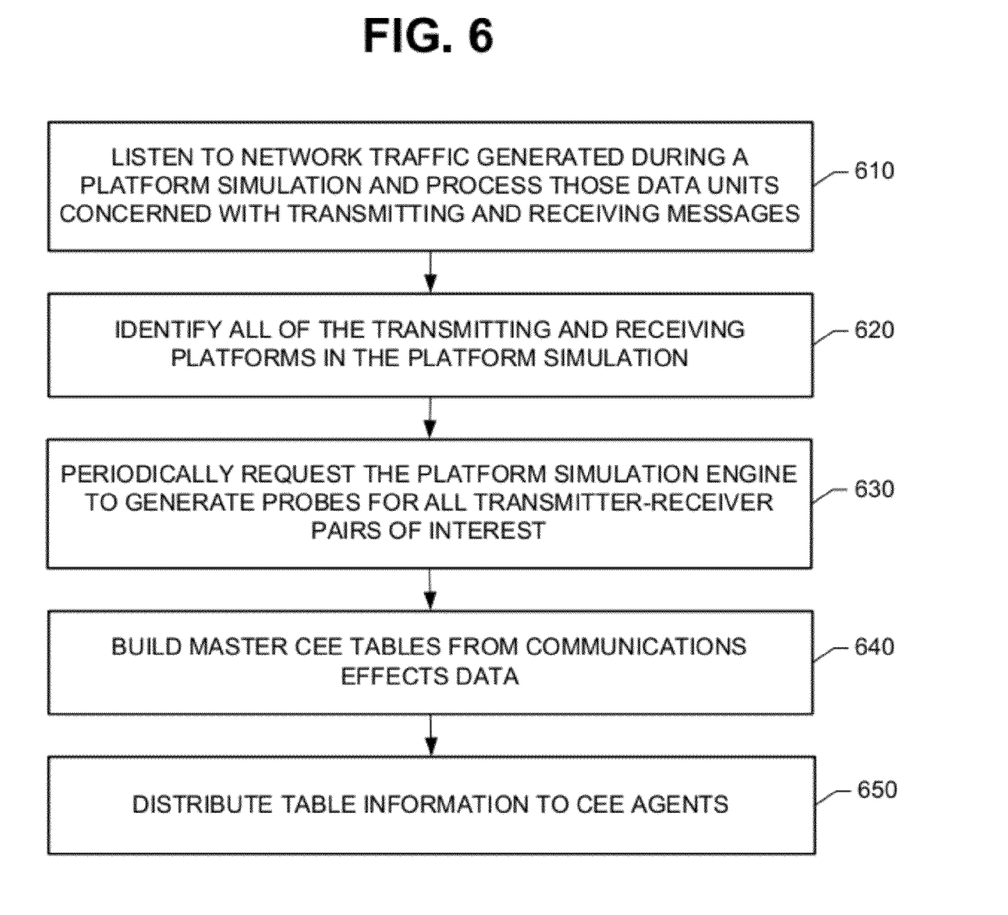
FIG. 6 is an illustration of a method performed by a server of the communications effects engine.

Additional reference is made to FIG. 6, which illustrates an example of functions performed by the CEE server 560. In the example, data exchanged between the network simulators 540 and the CEE server 560 will follow the DIS protocol. A simulation that uses the DIS protocol generates data elements termed Protocol Data Units (PDUs) to specify data about the name, type, attributes, and behaviors of each entity in the simulation, including transmitting and receiving nodes. Examples of the PDUs are listed in Table 1 below.

At block 610, the CEE server 560 "listens" to the DIS traffic generated during a platform simulation and processes those PDUs that are concerned with transmitting and receiving messages.

TABLE 1

| | |
|---|---|
| Entity State PDU | Specifies positions of radios and jammers |
| Transmitter PDU | Specifies radio transmission parameters (frequency, etc.) |
| Electromagnetic Emission PDU | Specifies radar/jammer transmission parameters |
| IFF PDU | Specifies IFF transmission parameters |
| Start/Resume PDU | Monitors simulation time, and starts or resumes the simulation |
| Stop/Freeze PDU | Monitors simulation time, and stops or pauses the simulation |

At block 620, based on the DIS traffic, the CEE Server 560 identifies all of transmitting and receiving platforms in the platform simulation. The CEE server 560 can also narrow the list of transmitter-receive pairs to only those of interest.

At block 630, the CEE Server 560 periodically requests the platform simulation engine to generate probes for all transmitter-receiver pairs of interest. Each request interrupts the platform simulation and causes a transmitting platform of a pair to send a short surrogate message to its paired receiving platform.

The probes may be requested at periodic intervals, which can be configured frequently enough so that the transmission characteristics between platforms can be reasonably assumed to not vary much between the surrogate message and the message during a simulation, but not so frequently that the probes themselves impose any significant additional traffic load across the network or on the network simulator. For example, short surrogate messages may be sent 1-2 times per second.

The network simulators 540 processes output data from the force effects simulators 520 to produce communications effects data.

At block 640, the CEE server 560 saves the communications effects in Master CEE tables 580. The tables 580 contain information on broken as well as degraded links. The tables 580 may be organized by transmitter-receiver pairs and the content in each table is a specific characteristic of that pair (i.e., connectivity statistics, delay statistics, and error statics).

Table 2 provides a simple example of a three by three connectivity Table. The columns correspond to the transmitting platforms, and the rows correspond to the receiving platforms. A table entry of "1" indicates "connectivity" between the transmitting platform and the receiving platform. A table entry of "0" indicates "no connectivity" between the transmitting platform and the receiving platform. The diagonal in the connectivity table is set to "0" by convention.

TABLE 2

| | Platform 1 | Platform 3 | Platform 3 |
|---|---|---|---|
| Platform 1 | 0 | 1 | 1 |
| Platform 2 | 1 | 0 | 0 |
| Platform 3 | 1 | 0 | 0 |

At block 650, table data 590 is distributed to the CEE agents 570. Initially, complete tables can be sent to the CEE agents 570. The Master CEE tables 580 can be published to all of the CEE agents 570 in the CEE, or the CEE agents 570 are only supplied with the information that they need. For example, a receiver may have multiple transmitters with which it could communicate, however only one transmitter is communicating. Therefore an initial data distribution may contain all potential transmitters (with no connectivity listed for all but one).

After the table data 590 has been initially been published, subsequent publication may include only those table entries that have changed. The changes can be published asynchronously, as they occur, to minimize the information exchange between the CEE server 560 and the CEE agents 570. Moreover, extensive calculations do not have to be re-computed for every single transmission event, saving time for both the CEE server 560 and the CEE agents 590, which would have to wait for those results.

Figure 7:
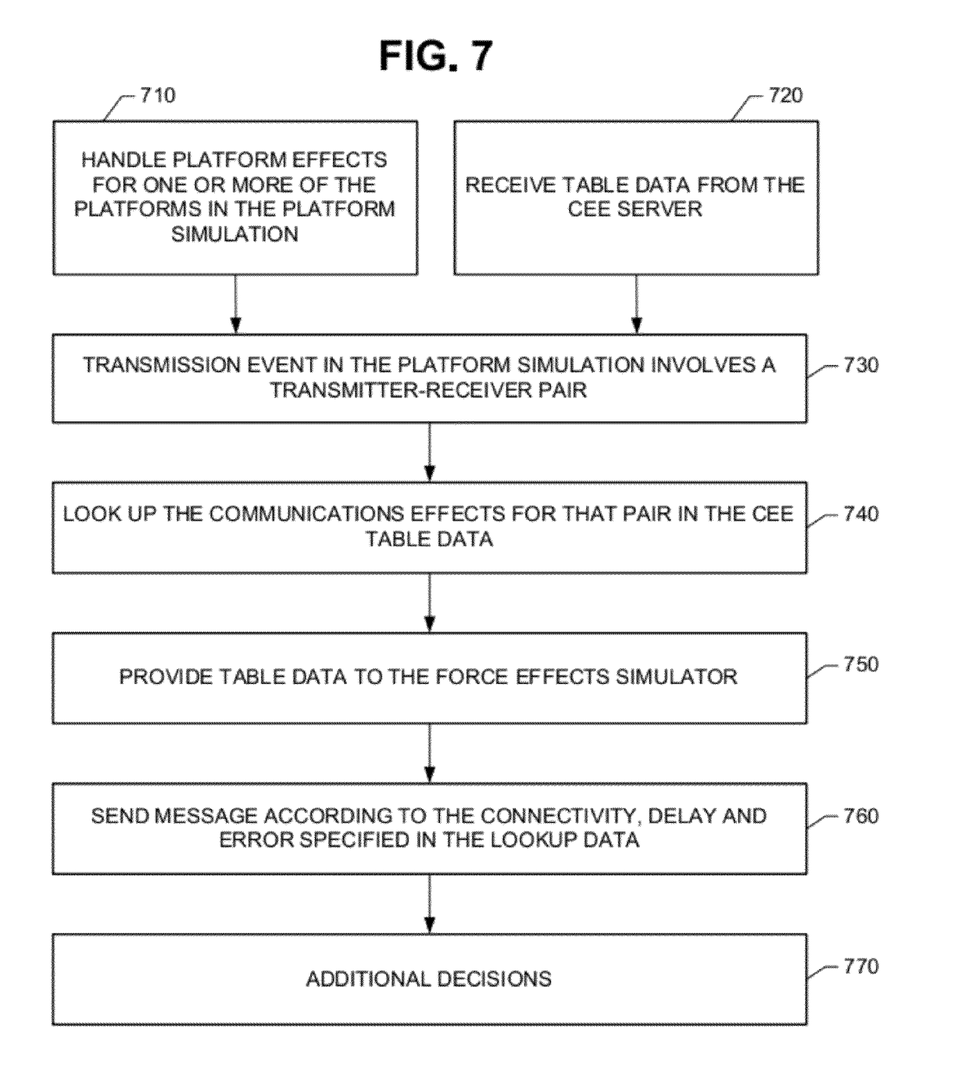
FIG. 7 is an illustration of a method performed by a CEE client of the communications effects engine.

Reference is now made to FIG. 7, which illustrates an example of operations performed by a client 535. At block 710, the CEE client 535 handles platform effects for one or more of the platforms in the platform simulation. At block 720, the CEE client 535, via its CEE agent 570, receives table data from the CEE server 560. Both are ongoing processes.

At blocks 730 to 750, when a transmission event occurs in the platform simulation between a transmitter-receiver pair, the CEE agent 570 looks up the communications effects for that pair in the CEE table data 590, and provides the table data to the force effects simulator 520. At block 760, the force effects simulator 520 sends a message from the transmitter in that pair to the receiver in that pair. The message is sent according to the connectivity, delay and error specified in the lookup data. Thus, the table lookup provides a very close approximation without having to wait for additional computations to be performed.

At block 770, any additional decisions to be made by the CEE agent 570 may be made. These decisions may include random probability draws, which may be communicated back to the CEE server 560 in the form of a "traffic report". The CEE server 560 may use this "traffic report" to appropriately alter the known state of the simulated network, thus improving the modeling used to create the predicted results. The modeling could be improved because the client 550 reports back to the network simulator 540 (i.e. a feedback loop), which makes the network simulator's traffic more representative of the actual network traffic.

Figure 8:
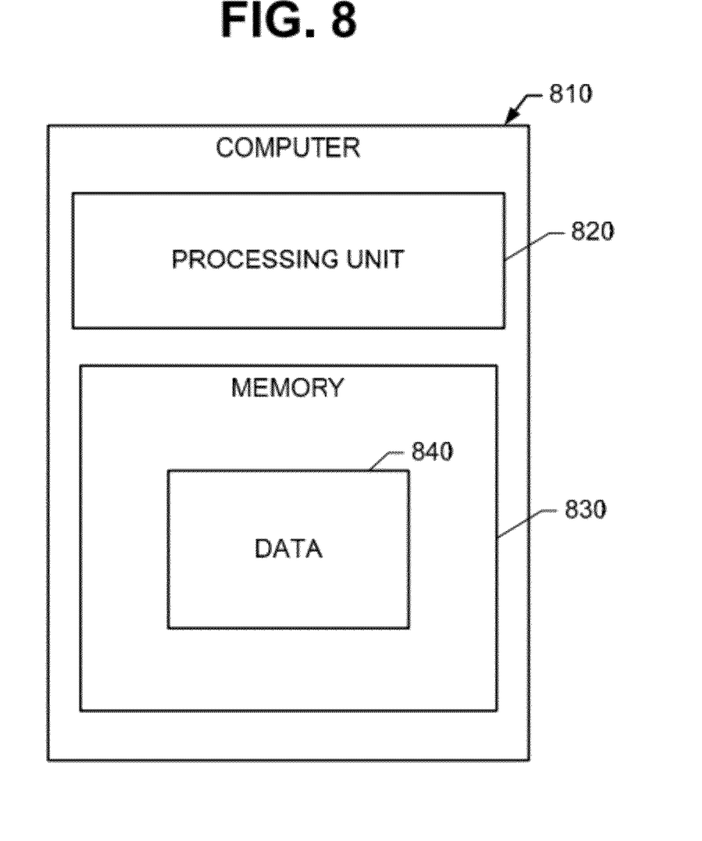
FIG. 8 is an illustration of a computer.

FIG. 8 is an illustration of a computer, which can be used in either the platform simulation engine or the CEE. The computer 810 includes a processing unit 820 and memory 830 encoded with data 840 such as platform simulator tools or network simulator tools or CEE server applications, or client agent applications. The memory 830 may also store Master CEE tables 580 or client table data 590.

Thus disclosed is a simulator that offers several advantages, especially for a low latency network. Quick table lookups reduce the lag between a transmission event and the known results. Drop decisions can be provided immediately rather than waiting for a message timeout.

The CEE supports scalability to very large networks. The communication effects calculations can be sophisticated and complex without affecting the overall simulation performance, which means that the CEE scales well to increasingly higher fidelity simulations.

Scalability is further enhanced because the CEE can put minimal traffic on the Simulation Data Bus. The CEE may promulgate only traffic characteristics of interest to the platform simulation engine, and it may distribute only changes to the characteristics of traffic of interest.

The invention claimed is:

1. A method comprising using a communications effects engine to simulate real-time, high fidelity communication effects for a platform simulation, including:
   requesting a transmitter in the platform simulation to send a surrogate message to a receiver in the platform simulation;
   computing communications effects in response to the message and saving the communications effects for later use, wherein saving the communications effects includes building tables of communications effects for the transmitter-receiver pair; and distributing the tables to platform simulators; and
   when a future communication event involving the transmitter and receiver occurs in the platform simulation, using the saved effects to simulate the communication effects for that event.

2. The method of claim 1, wherein additional surrogate messages are requested periodically; and wherein the saved communications effects are updated.

3. The method of claim 1, wherein the distributed tables are updated only by sending changed table entries.

4. The method of claim 1, wherein a platform simulator performs a table lookup to determine the communication effects for a future communications event, and delivers a message in accordance with the looked-up effects.

5. The method of claim 1, wherein the saved effects indicate statistical connectivity, delay, and error characteristics.

6. The method of claim 1, wherein a network simulator tool is used to compute the communications effects in response to the surrogate message.

7. The method of claim 1, further comprising listening to network traffic in the platform simulation, and identifying the transmitter-receiver pair prior to sending the surrogate message.

8. An article for causing a server to interact with a platform simulation engine including a plurality of distributed platform simulators, the article comarising non-transitory computer-readable memory encoded with code for causing the server to:
   periodically send probes for all transmitter-receive pairs of interest;
   receive communications effects data in response to the probes and save the communications effects data; and
   build tables of the saved communications effects data; and
   distribute table information to the platform simulators in advance of future communications events so the simulators can use the data to simulate the future communications events.

9. The article of claim 8, wherein the table information is updated only by sending changed table entries.

10. The article of claim 8, wherein each platform simulator is supplied only with needed table information.

11. The article of claim 8, wherein the saved communications effects data indicates statistical connectivity, delay, and error characteristics.

* * * * *